US009155347B2

(12) United States Patent
Van Waes

(10) Patent No.: US 9,155,347 B2
(45) Date of Patent: Oct. 13, 2015

(54) HELMET WITH MAGNETIC FIXING MEANS FOR EYEWEAR

(75) Inventor: Sean Van Waes, Antwerp (BE)

(73) Assignee: Lazer Sport NV, Antwerp (BE)

(*) Notice: Subject to any disclaimer, the term of this patent is extended or adjusted under 35 U.S.C. 154(b) by 290 days.

(21) Appl. No.: 13/820,469

(22) PCT Filed: Sep. 5, 2011

(86) PCT No.: PCT/EP2011/065309
§ 371 (c)(1),
(2), (4) Date: May 22, 2013

(87) PCT Pub. No.: WO2012/028743
PCT Pub. Date: Mar. 8, 2012

(65) Prior Publication Data
US 2013/0227768 A1  Sep. 5, 2013

(30) Foreign Application Priority Data

Sep. 3, 2010 (EP) ..................................... 10175267

(51) Int. Cl.
*A42B 3/18* (2006.01)
*G02C 3/02* (2006.01)

(52) U.S. Cl.
CPC .. *A42B 3/185* (2013.01); *G02C 3/02* (2013.01)

(58) Field of Classification Search
CPC .......... A42B 3/08; A42B 1/247; A42B 3/185; G02C 3/02
See application file for complete search history.

(56) References Cited

U.S. PATENT DOCUMENTS

| 5,719,655 | A | 2/1998 | Peschel et al. |
| 6,168,273 | B1 | 1/2001 | Dupraz et al. |
| 6,364,478 | B1 | 4/2002 | Jagasia |
| 6,892,393 | B1 | 5/2005 | Provost et al. |
| 8,245,320 | B2 | 8/2012 | Provost et al. |
| 8,696,112 | B1* | 4/2014 | Vaught .......................... 351/155 |
| 2006/0152671 | A1 | 7/2006 | Risso et al. |
| 2006/0236438 | A1* | 10/2006 | Rogers et al. ...................... 2/6.7 |
| 2007/0192933 | A1 | 8/2007 | Kam |
| 2009/0195747 | A1 | 8/2009 | Insua |
| 2009/0284712 | A1* | 11/2009 | Brooks .......................... 351/155 |
| 2011/0069273 | A1* | 3/2011 | Lu .................................. 351/51 |

(Continued)

FOREIGN PATENT DOCUMENTS

| DE | 199 34 958 | 2/2001 |
| WO | WO 2005/055892 | 6/2005 |
| WO | WO 2005/076055 | 8/2005 |

(Continued)

*Primary Examiner* — Shaun R Hurley
*Assistant Examiner* — Andrew W Sutton
(74) *Attorney, Agent, or Firm* — Levy & Grandinetti

(57) ABSTRACT

The invention is a kit including a helmet having front straps fixed at a first end to the helmet such that in use, the two front straps fasten together. A continuous front strap is formed running from one fixing device to another, under the chin of the wearer and crossing the temporal line on each side of the wearer's face. Each front strap includes a magnetic or magnetically attractable element extending both above and below the temporal line when the helmet is worn with the front straps fastened together. The kit includes eyewear which extends on both sides of the face, along the respective temporal lines up to at least the points where the front straps intersect their respective temporal lines, and magnetically couples the eyewear to the magnetic or magnetically attractable element fixed to the front straps of the helmet.

14 Claims, 2 Drawing Sheets

(56) References Cited

U.S. PATENT DOCUMENTS

2013/0227768 A1* 9/2013 Van Waes .................. 2/422
2014/0013486 A1* 1/2014 Leon ........................ 2/209.11

FOREIGN PATENT DOCUMENTS

| WO | WO 2007/141614 | 12/2007 |
| WO | WO 2008/020359 | 2/2008 |

* cited by examiner

HELMET WITH MAGNETIC FIXING MEANS FOR EYEWEAR

This Application is the U.S. National Phase of International Application Number PCT/EP2011/065309 filed on Sep. 5, 2011, which claims priority to European Application Number 10175267.3 filed on Sep. 3, 2010.

TECHNICAL FIELD

The present invention relates to the field of helmets. In particular, it concerns helmets provided with means for removably fixing and holding eyewear without applying any strain to the temporal regions or ears of the wearer, and providing the wearer with great comfort and easy handling of the eyewear.

BACKGROUND FOR THE INVENTION

Many activities require a helmet to protect the head of an individual, such as for example activities in the fields of military, building, mining, and in particular sports such as flying (paragliding, hang gliding), mountaineering, skating, and cycling. In all cases the helmet is generally held on the head with straps running under the chin, which must be adjusted to fit the individual, with generally a first strap running from the helmet, over the temple region and down to the chin and often a second strap starting from behind the ear and joining the first strap to further stabilize the helmet. As a rule of thumb, the more extreme is the activity and stronger is an expected impact, the more a helmet is required and the more tightly the straps must be adjusted, For example, the death in March 2003 of the professional cyclist Andrei Kivilev prompted the authorities to introduce a regulation for the mandatory use of a helmet in official races.

When for leisure users of e.g., bicycles, it is generally stipulated that the straps should be adjusted such that it should not be possible to insert more than one finger's thickness between the strap and the throat (cf. http://en.wikipedia.org/wiki/Bicycle_helmet), it is clear that professional riders wear their helmets even more tightly. In many cases the wearer of a helmet must also wear spectacles, to protect its eyes from the speed, insects, rain, sun, or for eye correction like the cyclist Tony Rominger who had poor eyesight. Spectacles are usually held on the nose by a bridge between the two eyepieces and by temple arms resting on top and the back of the ears. It can be very cumbersome and uncomfortable when wearing a helmet tightly strapped on one's head by a sling running over the temple region under the chin to wear spectacles with temple arms squeezed between the straps and the wearer's temples and uncomfortably resting on the ears. Furthermore, the handling of the eyewear during one such activities as described above, which can generally be done with one hand only, such as putting on, removing, tilting, or running the spectacles down the bridge of the nose in case of mist, rain, sudden change in luminosity or the like can be difficult, if not dangerous, with the helmet straps on the way. Alternatively, the temple arms may run over the straps, but this solution excessively strains the ear base as the temple arms are pulled outwards by the thickness of the straps.

For a closely related problem of people wearing noise protection or radio transmission ear muffs who must wear spectacles, a solution is proposed in DE19934958 wherein the temple arms of the spectacles can be fixed to the head arch of wearer. For instance, slots may be provided in the thickness of the head arch to receive the temple arms of the spectacles. Alternatively, magnets can be used.

WO2005076055 and WO2007141614 propose a headwear, such as a helmet or a cap, comprising a brim comprising extension structures fixed to the underside of said brim and comprising means for holding eyeglasses. In particular, elongated rods are fixed on one end to the brim and the other end, hanging down from the brim, comprise a hook, possibly magnetic, to support the spectacles bridge or temple arms. This solution, however, does not address the presence of a helmet strap intercepting spectacles temple arms in the wearer's temporal region.

U.S. Pat. No. 6,892,393 and US2010/0154093 disclose a helmet having a front brim continuous with a rim extending along each opposite side of the safety helmet adjacent to a pair of rim slots in the rim of the safety helmet. The eye wear has a right and a left temple arms. Each of the right and left temple arms has (a) a slide frame adapted to be suspended below the rim and to extend toward the front brim, and (b) at least one tong adapted to be removably and dependently attached from below to a corresponding one of the rim slots in the helmet for supporting the side frame. The lens is attached distally between the right and the lift structures and can pivot under the front brim between a lowered and a raised position and still remain subjacent to the front brim. The right and left structures are adjustable to provide an adjustable orientation of the lens while in the lowered position. This solution requires multiple components which are quite complex, voluminous, and heavy, which would not reach the standards of high level competitor's requirements.

SUMMARY OF THE INVENTION

The present invention is defined in the appended independent claims. Preferred embodiments are defined in the dependent claims. In particular, the present invention concerns a helmet for protecting the head of a wearer from external impacts and suitable for holding eyewear in place, said helmet comprising at least two front straps fixed at a first end thereof to the helmet such that, when the helmet is in place on the wearer's head, the fixing means of the front straps are located on each side of the head, at a point located above the temporal line defined between the eyes and the top bridge of the ears of the wearer, Each of the at least two front straps comprises fastening means suitable for fastening the two front straps together, such that a continuous front strap is formed running from one fixing means to the other, and passing under the chin of the wearer, and crossing said temporal lines on each side of the wearer's face, Characterized in that, each front strap comprises a magnetic material located such that it extends both above and below the temporal line when the helmet is worn with the front straps fastened together.

The helmet defined above is very useful when used in combination with a piece of eyewear comprising:

lenses mechanically connected to each other, suitable for covering the eyes of a wearer, and for resting on the wearer's nose bridge, said eyewear being suitable for extending on both sides of the face, along the respective temporal lines up to at least the temporal region defined as the area comprising the points where the front straps intersect their respective temporal lines, and further comprising magnetic elements located on the eyewear at each terminal end thereof, where it covers said temporal regions when worn by the wearer, wherein the North-South poles of each magnetic element are aligned along a direction substantially normal to said temporal regions when worn by the wearer or, in other words, normal to the plane formed by the straps over the temporal region when a helmet is worn.

A kit of parts comprising a helmet and eyewear as defined above allows the wearer of a helmet to comfortably and safely wear spectacles. It further allows easy manipulations of the eyewear such as putting on, removing, running up or down the nose bridge, tilting, and the like. If the magnetically coupling means of said eyewear is made of a magnetic material, the front straps may be provided with either a magnetic material of opposite polarirty, or with a magnetically attractable element, such as a ferromagnetic material. The helmet according to the present invention can also be used to fix other components such as a receiver earpiece which comprises means for magnetically coupling said earpiece to the magnetic or magnetically attractable element fixed to the front straps of the helmet, such that the earpiece falls snugly in place in the inlet of the ear canal. Other components can be a microphone or a sensor.

The helmet may be any helmet used for protecting a wearer's head, such as a sport helmet, an army helmet, a building site helmet, a fireman helmet, preferably it is a sport helmet, and more preferably a bicycle helmet.

In one aspect of the present invention, the eyewear comprises a pair of temple arms which are removably mountable at said terminal ends of the eyewear by means of the magnetic elements such as to allow them to rest on the bridge of the wearer's ears when worn. This allows the same spectacles to be worn with and without the helmet strapped under the chin. This is particularly interesting for corrective spectacles or high quality sunglasses which can be rather expensive.

BRIEF DESCRIPTION OF THE FIGURE

For a fuller understanding of the nature of the present invention, reference is made to the following detailed description taken in conjunction with the accompanying Figures, wherein.

DETAILED DESCRIPTION OF THE INVENTION

Figure 1:
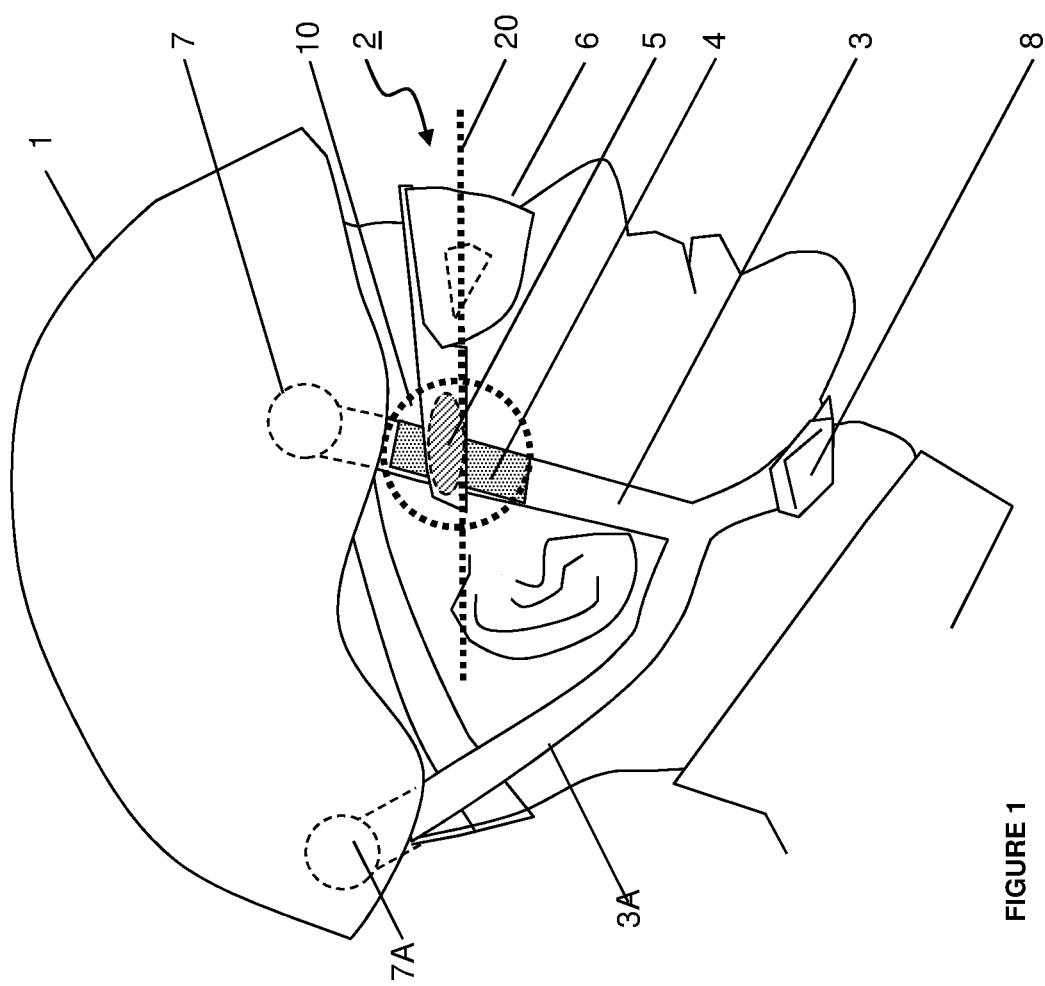
FIG. 1: shows a side view of a helmet and spectacles according to the present invention worn by a person.

As illustrated in FIG. 1, the present invention concerns a helmet (1) and eyewear (2) compatible for being worn simultaneously with a high degree of comfort and safety. In order to increase the level of comfort, the eyewear is not resting on the nose bridge and the ear bridges as in traditional spectacles comprising temple arms, which are not adapted to be worn with a helmet strapped on under the chin as discussed above. On the contrary, whilst still resting on the nose bridge, the eyewear (2) of the present invention does not comprise temple arms (at least not permanent ones) and comprise magnetic coupling means (5) suitable for getting coupled to a magnetic material (4) or magnetically attractable element (4) provided on the front straps (3) of the helmet, both coupling means (5) and magnetic or magnetically attractable element (4) being positioned such as to be superimposed in the temporal region (10) when worn by a person. The temporal region (10) is designated in FIG. 1 with a dotted circle and is defined as the region of the temple situated on the side of the head spanning as far forward as the eye and as low as the zygoma and infratemporal crest (cf. http://chestofbooks.com/health/anatomy/Human-Body-Constructon/The-Ternporal-Region.html). This way, temporal arms need not force their way above or below the front straps (3) to uncomfortably rest on the ear bridges.

The helmet (1) useful in the present invention must be provided with a pair of front straps (3) running from their fixing means (7) to the helmet, down across the temporal region (10) and are provided with fastening means (8) suitable for fastening the two straps together, such that a continuous strap is formed running from one fixing means (7) to the other, and passing under the chin of the wearer, and crossing the temporal line (20) on each side of the wearer's face. The temporal line (20) is an imaginary straight line defined as the line running between the eye and the top bridge of the ear on each side of the wearer's head and is illustrated in FIG. 1 as a dotted straight line (20). The term "front straps," referred to with numeral (3), is used herein to designate the straps which run across the temporal region (10) from their respective fixing means (7) substantially straight down to the chin of the wearer. The presence of a pair of front straps (3) is mandatory in the helmets of the present invention. The term "back straps", referred to with numeral (3A), on the other hand is used to designate the optional straps fixed to the helmet at a position (7A) located behind the earq, and which are fixed to the front straps (3) below the ears, forming a "Y" with the front straps (3). A back strap can be rigidly fixed to the front strap (e.g., sewn, glued, or welded to each other) or the point where the back strap (3A) joins the front strap (3) may be adjustable by any means well known in the art. Helmets are often provided with a back strap (3A) to further stabilize the helmet on the wearer's head.

It is preferred that the straps be provided with a magnetic material (4) fixed thereto such that it extends both above and below the temporal line (20) when the helmet is worn with the front straps (3) fastened together. Alternatively, the magnetic material (4) can be replaced by a magnetically attractable material, such as a ferromagnetic material. In the latter case, however, such helmet can be used only with eyewear comprising a magnetic material as magnetic coupling means (5). Basically, any of the following combinations between magnetic coupling means (5) of the eyewear and the magnetic or magnetically attractable element (4) of the front straps (3) are possible and can be used as long as they show a mutual attraction force of sufficient magnitude:

the two materials are magnets of opposite polarity;
one of the two materials is a magnet and the other is a magnetically attractable element.

The combination of two magnetically attractable materials does not work unless one of the two has been magnetized such as to retain its polarity. The attraction force between the magnetic or magnetically attractable element (4) and the magnetically coupling means (5) depends on the field of activity the helmet is designed for and on the type of eyewear used. The attractive force should be sufficient to ensure that the eyewear (2) is safely secured on the wearers's face in non exceptional conditions to be expected in the particular field of activity for which they are designed. On the other hand, removing the eyewear or adjusting their position should be sufficiently easy to be considered as comfortable by the wearer.

Figure 2:
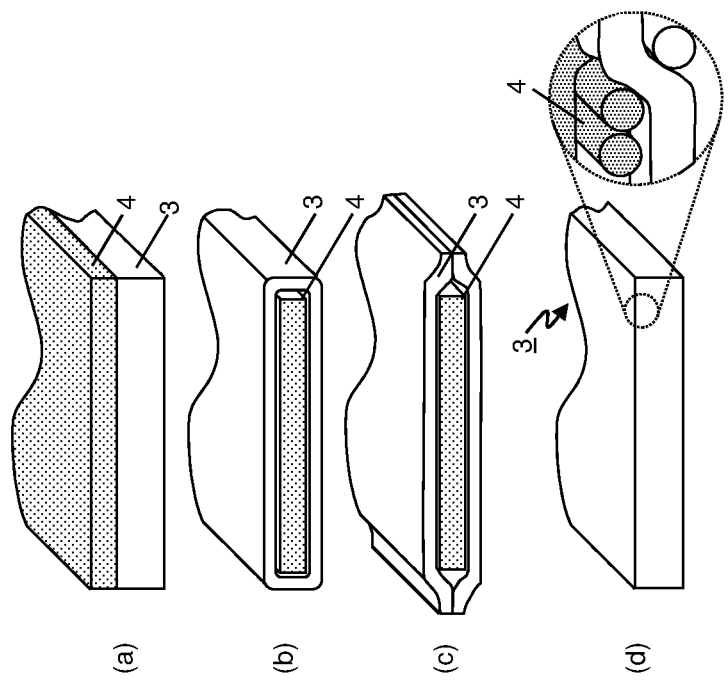
FIG. 2: shows cross-sections of various embodiments of front straps provided with a magnetic or magnetically attractable element according to the present invention.

Although they could be made of leather or of a polymer band, the front straps (3) are usually made of textile fibres, such as polyamide (nylon), polypropylene, or even polyaramid (e.g., kevlar) for high quality helmets, which are woven, braided (often tubular), or even knitted. The magnetic or magnetically attractable material (4) is preferably fixed on the side of the straps (3) facing away from the skin of the wearer (cf. FIG. 2(a)), but it can also be embedded in the strap structure (cf. FIG. 2(d)), or in case of a tubular strap, it can form the core of the strap (cf. FIGS. 2(b) and (c)). In particular, if the material (4) is in the form of a plate or a swatch it may be sewn, glued, or welded to the front straps, either to the surface facing away from the wearer's skin or inside a tubular or a sandwich structure. It can also be releasibly fixed to the front straps (3) by means of a loop and hook fastener (Velcro), a clip, a pin, or the like. Alternatively, fibres of magnetic or magnetically attractable material (4) may be co-woven, co-braided, or co-knitted with the front straps (3) made of woven, braided, or knitted synthetic fibres, at the appropriate location as illustrated in FIG. 2(d).

The front straps (3) fixed to the helmet on either side of thereof at a level (7) situated above the temporal region (10) of the wearer also comprise fastening means (8) for fastening the two front straps together, thus forming a continuous strap running from the fixing means (7) of one side of the helmet, through the temporal region of the wearer's face, down under its chin and all the way up to the fixing means (7) across the temporal region (10) of the other side. The fastening means (8) may be located anywhere between the two fixing points (7) of the straps (3). They are usually located under the wearer's chin, but sometimes they are off-centred to avoid having a more rigid structure than the textile straps pressing on the sensitive throat area. It is even possible to have the fastening means (8) made of a magnetic or magnetically attractable material (4) and located on the front straps at a location corresponding to the temporal region (10) of the wearer, thus providing one of the two coupling means for the eyewear on one side of the wearer's face (the second coupling means on the other side may be in any form as discussed above). In most cases, the fastening means (8) would be adjustable, to ensure that the helmet is properly held in position even in case of impact. Numerous solutions for fastening and adjusting the tension of the front chin straps (3) are known in the art and any of them can be applied to the helmets of the present invention. In the absence of fastening means (8) a continuous strap made of an elastically deformable material or structure and running from one side of the helmet to the other can be provided. The elastic strap would have to be stretched to pass it under the chin and released to allow it to recover its initial length and thus secure the helmet on the wearer's head.

The helmets of the present invention may be any type of helmets used in different fields of activities, provided they comprise front straps (3) fixed to the helmet at a point situated above the temporal line (20) as defined above. In particular, they are suitable for the practice of any type of sport such as for example parachuting, paragliding, hang gliding, skiing, snowboarding, mountaineering, rock climbing, skateboarding, skating, cycling, and the like. The helmets of the present invention are particularly suitable for cyclists. The helmets of the present invention may also be used in other fields of activities, where the wearer may have to be wearing eyewear. In particular, they can be used by military, firemen, lumberjacks, or in the building and heavy industries, mining, and the like.

In general terms, the eyewear (2) to be used together with the helmets (1) described above shall comprise:
lenses (6) mechanically connected to each other or forming a single piece suitable for covering the eyes of a wearer, and for resting on the wearer's nose bridge, said eyewear (2) being suitable for
extending on both sides of the face, along the respective temporal lines (20) up to at least the points where the front straps (3) intersect their respective temporal lines (20), and further comprising
means (5) for magnetically coupling said eyewear to the magnetic or magnetically attractable element (4) fixed to the front straps (3) of the helmet, said coupling means (5) being located on the eyewear (2) at said intersection points between eyewear and straps (3).

Figure 3:
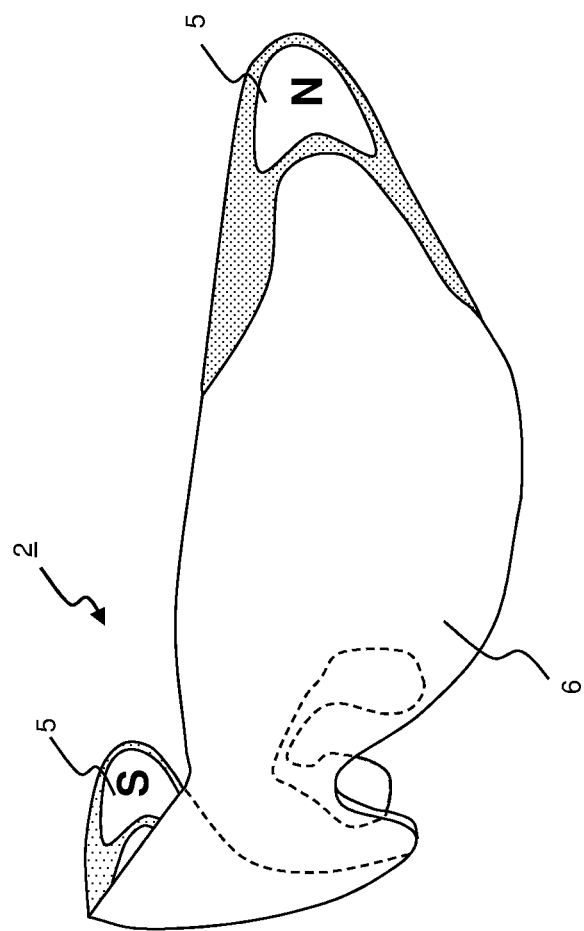
FIG. 3: shows an eyewear according to the present invention.

More specifically, in a particularly preferred embodiment of eyewear illustrated in FIG. 3, suitable for being coupled to the front straps of a helmet, the magnetically coupling means are magnetic elements (5) which North-Shouth poles are aligned along a direction normal to the plane formed by the straps when worn. In other words, the temporal zone (10) of the wearer defines a plane, which is substantially parallel to the plane formed by the front straps when worn, and which is substantially normal to the North-Pole axis of the magnetic means (5) when the eyewear is worn. (Note that the North and the South poles are indicated in FIG. 3 by the letters N and S, respectively). This ensures a greater magnetic contact between the magnetic means (5) and the corresponding magnetically coupling means on the formt straps, which strengthens the coupling of the eyewear to the side of the bearer's face, and also allows for more freedom to move the eyewear in different positions along the nose bridge. US2009/0195747 discloses eyewear comprising magnetic elements at each end of the frame thereof, to releasibly couple eyewear arms. Unfortunately, the eyewear disclosed in this document cannot be coupled to the front straps of a helmet according to the present invention, because the North-South poles are aligned along a direction parallel to the planes defined by the strap and temporal region (cf. in particular FIG. 4 of said document). With such magnetic configuration it is not possible, or at least quite awkward to magnetically couple the magnetic elements of the eyewear disclosed in US2009/0195747 to the front straps of a helmet according to the present invention.

The eyewear suitable for the present invention extend on each side of the face at least as far as the temporal region (10), at the intersection point with the front straps (3) where the magnetic elements (5) shall be located, but should not extend as far as the ear to avoid discomfort of the wearer. Like in US2009/0195747, in order to allow the eyewear (2) to be used also in the absence of the helmet (1), a pair of temple arms may be detachably mounted at each terminal end of the eyewear (2), to extend up to the ears for allowing them to rest on the bridge of the wearer's ears like traditional spectacles when worn without a helmet. Preferably the temple arms are snap-fitted into position. It can be taken advantage of the magnetic elements (5) to fix the temple arms with an appropriate design. The temple arms are preferably provided with a hinged section to allow storage of the eyewear in an appropriate case with the temple arms in a mounted but folded position. In use with helmets as described above, however, it is clear that the temple arms are not necessary and should be removed to increase the wearer's comfort.

The magnetically coupling means (5) of the eyewear (2) are made of a magnetic or magnetically attractable material, the choice of which depending on whether the helmets front straps (3) are provided with a magnetic or a magnetically attractable material (4) in any combination as discussed supra. Eyewear (2) which are suitable for being used in combination with helmets according to the present invention are described for example in U.S. Pat. No. 5,719,655, which description is incorporated herein by reference.

The eyewear (2) according to the present invention can be any type of eyewear such as protective or corrective eyewear, sunglasses, magnifying glasses, and the like. To enhance their stability when worn, they should preferably comprise means for resting on the nose bridge of the wearer. The lenses (6) and magnetically coupling means (5) may be mounted on a frame or, alternatively, the lenses (6) may extend far enough on each side to the temporal region (10) and support directly the coupling means (5) without a frame. The lenses (6) may be joined by a bridge or be part of a single piece of glass or plastic, both embodiments being designated herein as "being mechanically connected to each other".

Since the front straps (3) of a helmet (1) according to the present invention may be advantageously used for magnetically holding in place an eyewear (2) resting on the wearer's nose bridge, the combination of a helmet (1) and a piece of eyewear (2) as described above is particularly advantageous, because it allows the wearer to easily put on or remove said eyewear, move it into a position to its best comfort depending on the varying external conditions. All these operations can be carried out with one hand only, as often required in many activities requiring the wearing of a helmet, and without straining or hurting the ears and temporal regions (10) of the wearer. It also increases the safety of the wearer, who might be tempted to slacken the front straps (3) to release the strain on the ears or temporal regions provoked by the temple arms of traditional spectacles passing either above or below the front straps.

The magnetic or magnetically attractable material in the front straps (3) of a helmet (1) as discussed above may be conveniently used to fix other components, such as an earpiece or a microphone, said components being provided with magnetically coupling means (5A) similar to the magnetically coupling means (5) discussed with respect to the eyewear (2). These components should be designed to fall snugly into the desired position, such as the inlet of the ear canal for an earpiece or close to the mouth or the vocal cords for a microphone. Other such components could be a sensor connected to a computer for taking the pulse, tension or other parameters of the wearer during its activity.

The shell of some helmets, in particular for competition or comprising a protection for the lower jaw, extends beyond the temporal region (10) with the straps being fixed to the helmet at a location (7) situated below the temporal line (20). In this case, the magnetic or magnetically attractable element (4) may be fixed to the inner side of the helmet shell, at the level of the temporal line (20). The distal ends of the eyewear (2) would then be attracted outwardly against the helmet shell upon coupling the coupling means (5) with said magnetic or magnetically attractable elements (4).

Alternative forms for fixing an eyewear (2) to a helmet (1) may comprise magnetically coupling means (5) fixed to the front end of the helmet (1), where the helmet overlaps with the wearer's forehead. The coupling means (5) may be fixed to the lower rim of the helmet, or on the outer surface adjacent to said rim. The eyewear is then provided with magnetic or magnetically attractable elements (4) located on the upper side of the lenses (6), preferably on the upper frame, if any. In this embodiment, the eyewear needs not extend to the temporal region (10) since the fixing of the eyewear to the helmet occurs in the forehead region.

The present invention takes advantage of the magnetic forces between magnetically coupling means (5) located on the front straps of a helmet and on the eyewear at corresponding positions, corresponding to the temporal area (10) of a wearer. Other types of similar systems using non-magnetic coupling means can be envisaged as well. In a first embodiment, the two terminal ends of an eyewear comprise at a position corresponding to the temporal region of a wearer— and to the point of intersection between eyewear and front straps of a helmet worn by said wearer—a resilient clipping means, suitable for being clipped to the front straps. For example, the resilient clipping means can comprise a frame comprising two tongues, positioned on either side of a third tongue resiliently flexible, such that the third tongue can be slipped to the opposite side of a front strap as the other two tongues, in a manner comparable to a paper clip. The third tongue can be slipped in a direction running along the temporal line for example under the strap from front-to-back (i.e., in a direction towards the ears) or back-to-front (i.e., in a direction away from the ears). The front-to-back option is easier to apply and to remove the eyewear, with one hand, but is less stable and could lead to the loss of the eyewear in case of impacts or vibrations. The back-to-front option is a little more cumbersome, in particular, to remove the eyewear, but is much more secure and suitable for rough activities, like mountain biking on rough grounds or the like. An alternative embodiment to the "paper clip" system is the use of resilient clamping clips, such as crocodile clips, comprising resilient means, such as a coil spring, naturally biased to close the jaws of the clamping clip. One advantage of an eyewear provided with clipping means is that it can be used with any helmet (comprising front straps, of course!).

Another example of non-magnetic coupling means between eyewear and the front straps of a helmet are loop and hook fasteners, commonly referred to by the tradename Velcro. Exactly like the magnetic coupling means (5) of the present invention, the terminal ends of an eyewear covering the temporal region of a wearer are provided with one element of a loop and hook fastening means, say for example, with the loop element, and the front straps of a helmet are provided at a location corresponding to the temporal region of the wearer when the straps are fastened under the chin, with the complementary element of said loop and hook fastening means, in the example, the hook element. Loop and hook fastening means yield excellent shear strength, and are therefore quire suitable for holding eyewear in position. In the example, the hook element was provided on the straps. The other way round is of course possible, but since the element on the straps never enters in contact with the skin of the wearer, it is preferred that the hook element be provided on the straps.

In yet an alternative embodiment, the eyewear and front straps of a helmet are provided with snap fit means. For example the snap fit means may be a press studs system, comprising a first press stud element (e.g., the female) being fixed to a front strap of a helmet, and the complementary stud element (e.g., the male) being fixed to the terminal ends of the eyewear, oriented. Alternatively a resilient clasp can be used, of the type wherein a male element can be fixed to the terminal ends of the eyewear, with at least one flexible tongue suitable for snap fitting into a female element fixed to the front straps of a helmet.

The present invention, comprising magnetic coupling means between an eyewear and the front straps of a helmet is considered as being advantageous over the foregoing alternative fastening means in terms of reliability and ease and comfort of use.

The invention claimed is:

1. A helmet for protecting the head of a wearer from external impacts and suitable for holding eyewear in place, said helmet comprising at least two front straps fixed with a fixing device at a first end of the front straps to the helmet, the fixing devices of the at least two front straps are located at opposite sides of the helmet, each of the at least two front straps comprises fastening devices suitable for fastening the two front straps together, such that a continuous front strap is formed running from one fixing device to the other, and able to pass under a chin of the wearer, wherein each front strap comprises a magnetic material located such that it extends over a portion of each of the two front straps, located between the fixing device of the corresponding front strap and the fastening devices.

2. The helmet according to claim 1, wherein the magnetic material is either (a) sewn to the front straps, (b) glued to the front straps, (c) welded to the front straps, (d) releasably fixed to the front straps by a loop and hook fastener, a clip, a pin, or (e) fibres of magnetic material are co-woven, co-braided, or co-knitted with front straps made of woven, braided, or knitted synthetic fibres, at the appropriate location.

3. The helmet according to claim 2, which is a sport helmet, an army helmet, a building site helmet, or a fireman helmet.

4. The helmet according to claim 3 further comprising a back strap, with one end thereof being fixed to the helmet behind the wearer's ears when worn and the other end thereof being fixed to the front strap at a location below the wearer's ear, the back strap thus forming a Y-shape with the front strap.

5. The helmet according to claim 4, wherein the fastening device comprises an adjusting device for adjusting the tension of the continuous front strap formed.

6. A kit of parts comprising:
(a) a helmet for protecting the head of a wearer from external impacts, said helmet comprising at least two front straps fixed with a fixing device at a first end of the straps to the helmet, the fixing devices of the at least two front straps are located at opposite sides of the helmet, each of the at least two straps comprises fastening devices suitable for fastening the two front straps together, such that a continuous front strap is formed running from one fixing device to the other, and able to pass under a chin of the wearer, and each front strap comprises a magnetic or magnetically attractable element located such that it extends over a portion of each of the two front straps, located between the fixing device of the corresponding front strap and the fastening devices, and (b) eyewear comprising lenses mechanically connected to each other or forming a single piece suitable for covering the eyes of a wearer, and for resting on the wearer's nose bridge said eyewear extending over two coupling areas overlapping with the magnetic or magnetically attractable elements of each front strap, and further comprising a coupling device for magnetically coupling said eyewear to the magnetic or magnetically attractable elements fixed to the front straps of the helmet, said coupling device being located on the eyewear said two coupling areas.

7. The kit of parts according to claim 6, wherein the coupling devices of the eyewear are made of a magnetic material.

8. The kit of parts according to claim 6, wherein the front straps of the helmet are provided with magnetically attractable elements, instead of magnetic elements.

9. The kit of parts according to claim 8, wherein the eyewear further comprises a pair of temple arms which are removably mountable at each of two terminal ends of the eyewear such as to allow them to rest on the bridge of the wearer's ears when worn without a helmet.

10. The kit of parts according to claim 9, further comprising an additional component selected among a receiver earpiece, a microphone, and a sensor, said component comprising a device for magnetically coupling it to the magnetic or magnetically attractable element fixed to the front straps of the helmet.

11. The kit of claim 10 wherein the front straps of the helmet magnetically hold in place the eyewear resting on the wearer's nose bridge and optionally other components selected among a receiver earpiece, a microphone, and a sensor.

12. The helmet according to claim 1, which is a sport helmet, an army helmet, a building site helmet, or a fireman helmet.

13. The helmet according to claim 1 further comprising a back strap, with one end thereof being fixed to the helmet behind the wearer's ears when worn and the other end thereof being fixed to the front strap at a location below the wearer's ear, the back strap thus forming a Y-shape with the front strap.

14. The kit of parts according to claim 6, wherein the eyewear further comprises a pair of temple arms which are removably mountable at each of two terminal ends of the eyewear such as to allow them to rest on the bridge of the wearer's ears when worn without a helmet.

* * * * *